(12) United States Patent
Fujita

(10) Patent No.: US 8,576,779 B2
(45) Date of Patent: Nov. 5, 2013

(54) RADIO COMMUNICATION APPARATUS AND PACKET FORWARDING METHOD

(75) Inventor: Hiroshi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 13/095,225

(22) Filed: Apr. 27, 2011

(65) Prior Publication Data

US 2011/0268030 A1      Nov. 3, 2011

(30) Foreign Application Priority Data

Apr. 30, 2010   (JP) .................................. 2010-105433

(51) Int. Cl.
*H04W 4/00*   (2009.01)

(52) U.S. Cl.
USPC ......................................................... 370/328

(58) Field of Classification Search
USPC .............. 370/328, 310.2, 312, 315, 282, 278, 370/332, 338, 349, 389, 392, 432, 471, 473, 370/492, 468, 395, 311
See application file for complete search history.

(56) References Cited

U.S. PATENT DOCUMENTS

| 8,451,838 B2 * | 5/2013 | Ra et al. ........................ 370/392 |
| 8,462,685 B2 * | 6/2013 | Itagaki .......................... 370/311 |

FOREIGN PATENT DOCUMENTS

| JP | 2008-17028 A | 1/2008 |
| WO | WO-2006/129863 | 12/2006 |

* cited by examiner

*Primary Examiner* — Chi Pham
*Assistant Examiner* — Alexander O Boakye
(74) *Attorney, Agent, or Firm* — Fujitsu Patent Center

(57) ABSTRACT

A radio communication apparatus including: a radio communication interface; and a processor; the processor being configured to detect a first radio communication apparatus and a second radio communication apparatus based on a piece of address information received by the radio communication interface; and to select one of a first layer and a second layer as a forwarding layer, in which a packet is forwarded to a next forwarding address according to the radio communication apparatus of the next forwarding address corresponding to a destination address of the packet.

7 Claims, 16 Drawing Sheets

| SECOND LAYER ADDRESS | | FIRST LAYER ADDRESS | |
|---|---|---|---|
| DESTINATION ADDRESS | FORWARDING ADDRESS | DESTINATION ADDRESS | FORWARDING ADDRESS |
| 10-1 | 10-1 | 10-1 | 10-1 |
| 10-2 | 10-1 | 10-2 | 10-1 |
| 10-3 | 10-3 | | |
| 10-4 | 10-1 | | 10-1 |
| 10-5 | 10-3 | 10-5 | |

| SECOND LAYER ADDRESS | | FIRST LAYER ADDRESS | | TRANSFER LAYER |
|---|---|---|---|---|
| DESTINATION ADDRESS | FORWARDING ADDRESS | DESTINATION ADDRESS | FORWARDING ADDRESS | |
| 10-1 | 10-1 | 10-1 | 10-1 | FIRST LAYER |
| 10-2 | 10-1 | 10-2 | 10-1 | FIRST LAYER |
| 10-3 | 10-3 | | | SECOND LAYER |
| 10-4 | 10-1 | | 10-1 | FIRST LAYER |
| 10-5 | 10-3 | 10-5 | | SECOND LAYER |

RADIO COMMUNICATION APPARATUS AND PACKET FORWARDING METHOD

CROSS-REFERENCE TO RELATED APPLICATIONS

This application is based upon and claims the benefit of priority from the prior Japanese Patent Application No. 2010-105433 filed on Apr. 30, 2010, the entire contents of which are incorporated herein by reference.

FIELD

The embodiments discussed herein are related to a radio communication apparatus and a packet forwarding method of a packet.

BACKGROUND

In an ad hoc communication, a multi-hop communication is performed to send a packet to a radio communication apparatus as a final destination when a radio communication apparatus relays a packet that is transmitted from another radio communication apparatus. In a conventional technique, packet forwarding processing in the multi-hop communication is performed in a layer that manages routing processing, for example, a layer 3 of Open System Interconnection (OSI) reference model.

There is a proposal of a radio communication network in which a radio communication apparatus 31, which includes a forwarding module belonging to a Media Access Control (MAC) layer that is lower than an Internet layer, forwards a packet by the multi-hop communication.

PATENT DOCUMENT

[Patent Document 1] Japanese Laid-open Patent Publication No. 2008-17028
[Patent Document 2] International Patent Publication No. WO2006/129863

SUMMARY

According to an aspect of the invention, a radio communication apparatus including: a radio communication interface configured to transmit or receive radio signals; and a processor configured to control the radio communication interface to forward a packet to a next forwarding destination in a first layer; to control the radio communication interface to forward the packet to the next forwarding destination in a second layer which is higher than the first layer; to control the radio communication interface to receive a piece of address information of another radio communication apparatus in the first layer from a first radio communication apparatus as the other radio communication apparatus which forwards the packet in the first layer; to control the radio communication interface to receive the piece of address information of the other radio communication apparatus in the second layer from the first radio communication apparatus and receives the piece of the address information of the radio communication apparatus of a second type in the second layer from a second radio communication apparatus which forwards the packet in the second layer; to detect the first radio communication apparatus and the second radio communication apparatus based on the piece of address information received by the radio communication interface; and to select one of the first layer and the second layer as a forwarding layer, in which the packet is forwarded to a next forwarding address according to the radio communication apparatus of the next forwarding address corresponding to a destination address of the packet.

The object and advantages of the invention will be realized and attained by at least the features, elements and combinations particularly pointed out in the claims. It is to be understood that both the foregoing general description and the following detailed description are exemplary and explanatory and are not restrictive of the invention, as claimed.

DESCRIPTION OF EMBODIMENTS

In a multi-hop communication, a packet may be forwarded in a layer that is lower than a layer that manages routing processing. Hereinafter, the layer that manages the routing processing is referred to as a "layer A," and the layer that is lower than the layer A is referred to as a "layer B." The layer B is lower than the layer A. Thus, when a packet is forwarded in the layer B, processing delay is reduced compared to the multi-hop communication where the packet is forwarded in the layer A.

However, a communication protocol used for the packet forwarding in the layer B is different from the communication protocol used for the packet forwarding in the layer A. Therefore, a network that includes both the conventional radio communication apparatus that supports simply the packet forwarding in the layer A and the radio communication apparatus that supports the packet forwarding in the layer B may not be configured. Thus, in the multi-hop communication network, the packet forwarding in the layer A may not be present with the packet forwarding at a higher speed in the layer B.

An aspect of the embodiments is to realize a multi-hop communication in which packet forwards in a plurality of layers are performed.

Figure 1:
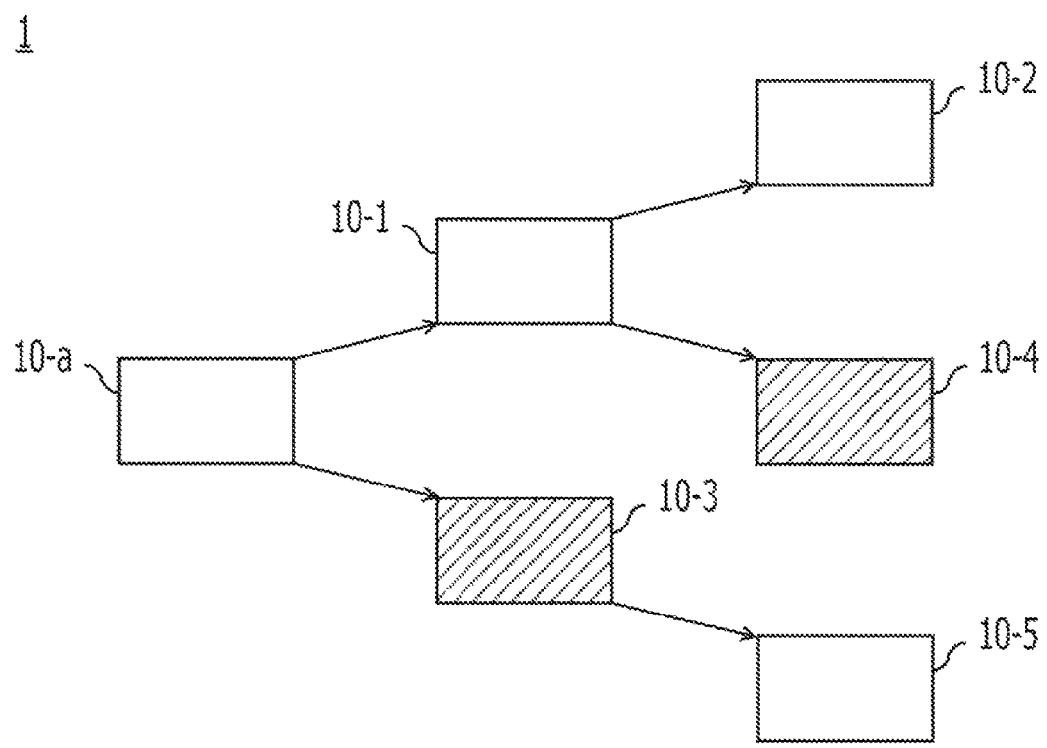
FIG. 1 is a diagram illustrating an example of a configuration of a network.

The embodiments of the invention will be described below with reference to the attached diagrams. FIG. 1 is a diagram illustrating an example of a configuration of a network. A network 1 includes radio communication apparatuses 10-*a*, and 10-1 to 10-5. The network 1 is a multi-hop network in which a packet is transmitted by the multi-hop communication between a radio communication apparatus as a packet transmission source and another radio communication apparatus as a packet destination.

A line used to couple the radio communication apparatuses 10-*a* and 10-1 to 10-5 indicates a path through which a packet is forwarded between the radio communication apparatuses while the packet is forwarded from the radio communication apparatus 10*a* to the radio communication apparatus as the packet destination. For example, the packet is transmitted from the radio communication apparatus 10-*a* as the transmission source to the radio communication apparatus 10-2 as the destination through the radio communication apparatus 10-1. For example, the packet is transmitted from the radio communication apparatus 10-*a* as the transmission source to the radio communication apparatus 10-5 as the destination through the radio communication apparatus 10-3.

In the network 1, the radio communication apparatus of the first type is present with the radio communication apparatus of the second type. The radio communication apparatus of the first type may perform forwarding processing of a packet in the first layer or the second layer. On the other hand, the radio communication apparatus of the second type performs the forwarding processing of the packet in the second layer and does not have a forwarding function of the packet in the first layer. The first layer is lower than the second layer. For example, the first layer and the second layer are the layer 2 and the layer 3 in the OSI reference model, respectively.

In the example illustrated in FIG. 1, the radio communication apparatuses 10-*a*, 10-1, 10-2, and 10-5 are radio communication apparatuses of the first type, and radio communication apparatuses 10-3 and 10-4 are radio communication apparatuses of the second type.

Figure 2:
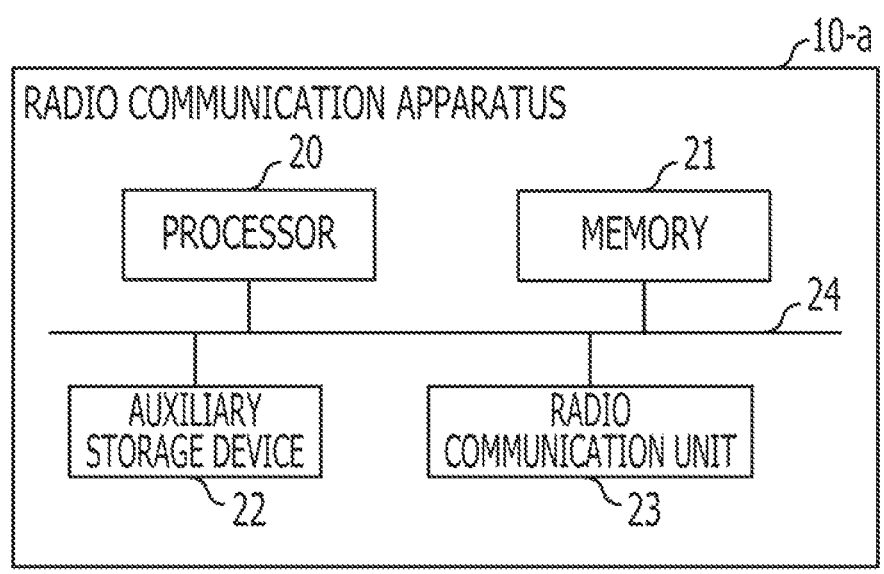
FIG. 2 is a diagram illustrating a hardware configuration example of a radio communication apparatus.

FIG. 2 is a diagram illustrating a hardware configuration example of the radio communication apparatus 10-*a* of the first type. The radio communication apparatuses 10-1 to 10-5 have a hardware configuration equivalent to the radio communication apparatus 10-*a*. The radio communication apparatus 10-*a* includes a processor 20, a memory 21, an auxiliary storage device 22, and a radio communication unit 23. The processor 20, the memory 21, the auxiliary storage device 22, and the radio communication unit 23 are coupled with each other by a bus 24 through which data is transmitted.

The auxiliary storage device 22 stores various computer programs and data used to control operations of the radio communication apparatus 10-*a*. The auxiliary storage device 22 may include a hard disk, a nonvolatile memory, and the like. The processor 20, which is a data processing device, executes a program stored in the auxiliary storage device 22 and performs various processing for controlling the operations of the radio communication apparatus 10-*a*. The memory 21 stores a program that is being executed by the processor 20 and data that is temporally used by the program. The radio communication unit 23 is a radio communication interface that performs radio communication processing of a radio signal among the radio communication apparatuses 10-1 to 10-5.

The hardware configuration illustrated in FIG. 2 is an example of the hardware configuration of the radio communication apparatuses 10-*a*, and 10-1 to 10-5. Various types of hardware configurations, which perform the processing described below, are applicable to the radio communication apparatuses 10-*a* and 10-1 to 10-5.

Figure 3:
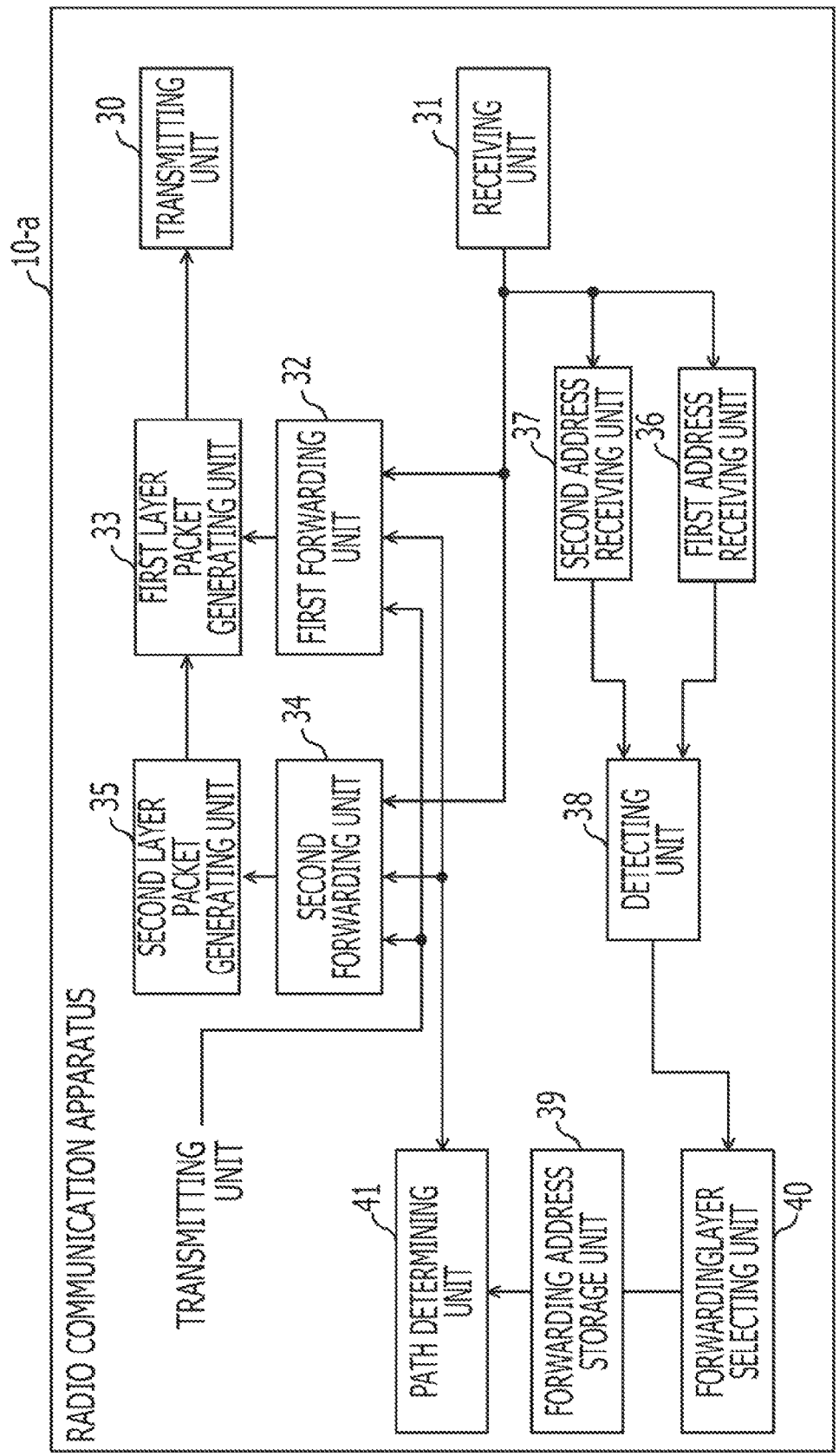
FIG. 3 is a diagram illustrating a first configuration example of a radio communication apparatus of a first type.

FIG. 3 is a diagram illustrating a first configuration example of the radio communication apparatus 10-*a* of the first type. The processing performed by components of the radio communication apparatus 10-*a* is realized if the processor 20 executes a forwarding program stored in the auxiliary storage device 22 illustrated in FIG. 2. FIG. 3 illustrates mainly functions related to explanation of this embodiment. The radio communication apparatus 10-1, 10-2, and 10-5 of the first type may have configurations equivalent to the radio communication apparatus 10-*a*. The other embodiments have the similar configurations.

The radio communication apparatus 10-*a* of the first type includes a transmitting unit 30, a receiving unit 31, a first forwarding unit 32, a first layer packet generating unit 33, a second forwarding unit 34, and a second layer packet generating unit 35. The radio communication apparatus 10-*a* includes a first address receiving unit 36, a second address receiving unit 37, a detecting unit 38, a forwarding address storage unit 39, a forwarding layer selecting unit 40, and a path determining unit 41.

The transmitting unit 30 transmits a packet to another radio communication apparatus. The receiving unit 31 receives the packet transmitted from the other radio communication apparatus. The first forwarding unit 32 obtains a data part from the received packet and outputs the data part to the first layer packet generating unit 33. Alternatively, the first forwarding unit 32 outputs the data, which is stored in the packet transmitted from the radio communication apparatus 10-*a* as the transmission source, to the first layer packet generating unit 33.

Furthermore, the first forwarding unit 32 performs the forwarding processing for forwarding the packet received from the receiving unit 31 to the radio communication apparatus as the next forwarding destination in the first layer. The first forwarding unit 32 performs the forwarding processing in the first layer for transmitting the packet transmitted from the radio communication apparatus 10-*a* as the transmission source to the radio communication apparatus as the next forwarding destination.

In the forwarding processing, the first forwarding unit 32 obtains, from the path determining unit 41, the forwarding address in the first layer according to the destination address of the packet from the path determining unit 41. The forwarding address is an address of the radio communication apparatus to which the packet is forwarded after being forwarded to the radio communication apparatus 10-*a*.

Hereinafter, the packet forwarded in the first layer is referred to as a "first layer packet," and the address used in the first layer is referred to as a "first layer address." Furthermore, the packet forwarded in the second layer is referred to as a "second layer packet," and the address used in the second layer is referred to as a "second layer address."

The first layer packet generating unit 33 generates a header, which includes at least a destination address and a forwarding address, and a packet, which stores the data received from the first forwarding unit 32. The generated first layer packet is transmitted by the transmitting unit 30.

The second forwarding unit 34 obtains the data part from the received packet and outputs the data part to the second layer packet generating unit 35. Alternatively, the second forwarding unit 34 outputs the data, which is stored in the packet transmitted from the radio communication apparatus 10-a as the transmission source, to the second layer packet generating unit 35. The second forwarding unit 34 performs the forwarding processing for forwarding the packet received by the receiving unit 31 to the radio communication apparatus as the next forwarding destination. Furthermore, the second forwarding unit 34 performs the forwarding processing for forwarding the packet, which is transmitted from the radio communication apparatus 10-a as the transmission source, to the radio communication apparatus as the next forwarding destination. In the forwarding processing, the second forwarding unit 34 obtains, from the path determining unit 41, the forwarding address in the second layer according to the destination address of the packet.

The second layer packet generating unit 35 generates a packet that stores a header that includes at least the forwarding address, the data obtained from the received packet by the second forwarding unit 34 or the data to be transmitted from the radio communication apparatus 10-a. The generated second layer packet is encapsulated in the first layer packet by the first layer packet generating unit 33 and is then transmitted by the transmitting unit 30.

The first address receiving unit 36 receives address information related to the first layer address of the radio communication apparatus of the first type in the network 1 from another radio communication apparatus, for example, the radio communication apparatuses 10-1, 10-2, or 10-5. For example, if the transmission source of the address information is the radio communication apparatus 10-1, the address information includes at least the first layer address of the radio communication apparatus 10-1. If the transmission source of the address information is the radio communication apparatus 10-1, the address information may include the first layer address, which is detected by the radio communication apparatus 10-1, of the radio communication apparatus of the first type other than the radio communication apparatus 10-1.

The second address receiving unit 37 receives, from another radio communication apparatuses, for example, one of the radio communication apparatuses 10-1 to 10-5, the address information related to the second layer address of the radio communication apparatus in the network 1. For example, if the transmission source of the address information is the radio communication apparatus 10-3, the address information includes at least the second layer address of the radio communication apparatus 10-3. If the transmission source of the address information is the radio communication apparatus 10-3, the address information may include the second layer address, which is detected by the radio communication apparatus 10-3, of the radio communication apparatus other than the radio communication apparatus 10-3.

Based on the address information received by the first address receiving unit 36 and the second address receiving unit 37, the detecting unit 38 detects the radio communication apparatuses 10-1, 10-2, and 10-5 of the first type and the radio communication apparatuses 10-3 and 10-4 of the second type. For example, the detecting unit 38 may detect the radio communication apparatus, which has the first layer address, as the radio communication apparatus of the first type. Furthermore, for example, the detecting unit 38 may detect the radio communication apparatus, which has the second layer address and does not have the first layer address, as the radio communication apparatus of the second type.

The radio communication apparatus 10-a may include a storage unit that stores the detected other radio communication apparatus of the first type. Moreover, the radio communication apparatus 10-a may include the storage unit that stores the detected radio communication apparatus of the second type.

Figure 4:
FIG. 4 is a diagram illustrating a first example of forwarding address information.

The forwarding address storage unit 39 stores forwarding address information that specifies a forwarding address according to each destination address of the packet. FIG. 4 is a diagram illustrating a first example of the forwarding address information. The forwarding address information may be a routing table illustrated in FIG. 4.

The forwarding address information is stored in a data configuration in which the destination address in the first layer, the forwarding address in the first layer, the destination address in the second layer, and the forwarding address in the second layer may be stored.

For example, if the forwarding address information has a table structure illustrated in FIG. 4, the table structure includes a destination address column in the first layer, a forwarding address column in the first layer, a destination address column in the second layer, and a forwarding address column in the second layer. For example, if the destination of the packet is the radio communication apparatus 10-2, the forwarding address information in a row indicated with a reference numeral 42 specifies that the radio communication apparatus to which the packet is forwarded after being forwarded to the radio communication apparatus 10-a is the radio communication apparatus 10-1.

Regarding the radio communication apparatus of the first type, the forwarding address information includes both the destination address and the forwarding address in the first layer and the destination address and the forwarding address in the second layer. On the other hand, regarding the radio communication apparatus of the second type, the forwarding address information does not include the destination address or the forwarding address in the first layer and includes the destination address and the forwarding address in the second layer.

Figure 5:
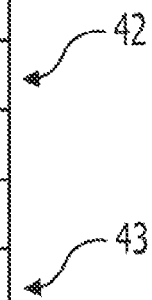
FIG. 5 is a diagram illustrating a second example of the forwarding address information.

FIG. 5 is a diagram illustrating a second example of the forwarding address information. In addition to items included in the forwarding address information illustrated in FIG. 4, the forwarding address information may include a forwarding layer that is selected by the forwarding layer selecting unit 40 described below. The forwarding layer is a layer in which a packet is forwarded between the radio communication apparatus 10-a and the radio communication apparatus of the forwarding address. For example, if the forwarding address information has a table structure illustrated in FIG. 5, the table structure has a forwarding layer column.

For example, the forwarding address information in the row indicated with the reference numeral 42 specifies that the packet is forwarded in the first layer from the radio communication apparatus 10-a to the radio communication apparatus 10-1. For example, the forwarding address information in the row indicated with the reference numeral 43 specifies that the packet is forwarded in the second layer from the radio communication apparatus 10-a to the radio communication apparatus 10-3. After determining the forwarding layer, the forwarding layer selecting unit 40 may store the forwarding layer in the forwarding address storage unit 39.

With reference to FIG. 3, the forwarding layer selecting unit 40 will be described below. Depending on whether the type of the radio communication apparatus of the forwarding address corresponding to the destination address is the first type or the second type, the forwarding layer selecting unit 40 determines the forwarding layer in which the packet, which is to be transmitted to the destination address, is forwarded to the next forwarding address. For example, if the radio communication apparatus of the forwarding address is the radio communication apparatus of the second type, the forwarding layer selecting unit 40 selects the second layer as a forwarding layer in which the packet is forwarded to the radio communication apparatus.

For example, if the radio communication apparatus of the forwarding address is the radio communication apparatus of the first type, the forwarding layer selecting unit 40 arbitrarily selects the first layer or the second layer as the forwarding layer in which the packet is forwarded to the radio communication apparatus. Alternatively, for example, if the radio communication apparatus of the forwarding address is the radio communication apparatus of the first type, the forwarding layer selecting unit 40 may select the first layer as the forwarding layer in which the packet is forwarded to the radio communication apparatus.

The path determining unit 41 receives the destination address of the packet from the first forwarding unit 32 or the second forwarding unit 34.

Alternatively, the path determining unit 41 receives the destination address of the packet, which is transmitted from the radio communication apparatus 10-*a* as the transmission source, from an application that requests packet transmission. Based on the forwarding address information stored in the forwarding address storage unit 39, the path determining unit 41 determines the forwarding address corresponding to the destination address.

The path determining unit 41 determines the forwarding layer, which is selected by the forwarding layer selecting unit 40 to correspond to the destination address, as the forwarding layer used to forward the packet to the forwarding address. As illustrated in the forwarding address information in FIG. 5, the path determining unit 41 may read out the forwarding layer from the forwarding address storage unit 39 if the forwarding layer selected by the forwarding layer selecting unit 40 is stored in the forwarding address storage unit 39.

If the forwarding layer is the first layer, the path determining unit 41 outputs the destination address and the forwarding address to the first forwarding unit 32. The first layer address is used as the forwarding address. If the radio communication apparatus of the destination address is the radio communication apparatus of the first type, the first layer address or the second layer address may be used as the destination address. If the radio communication apparatus of the destination address is the radio communication apparatus of the second type, the second layer address is used as the destination address.

The first forwarding unit 32 outputs the destination address and the forwarding address, which are received from the path determining unit 41, to the first layer packet generating unit 33. The first layer packet generating unit 33 stores the destination address and the forwarding address, which are received from the first forwarding unit 32, in the header.

If the forwarding layer of the packet is the first layer and the second layer address is used as the destination address, the first layer packet generating unit 33 may store the destination address in an extension part of the header.

Figure 6:
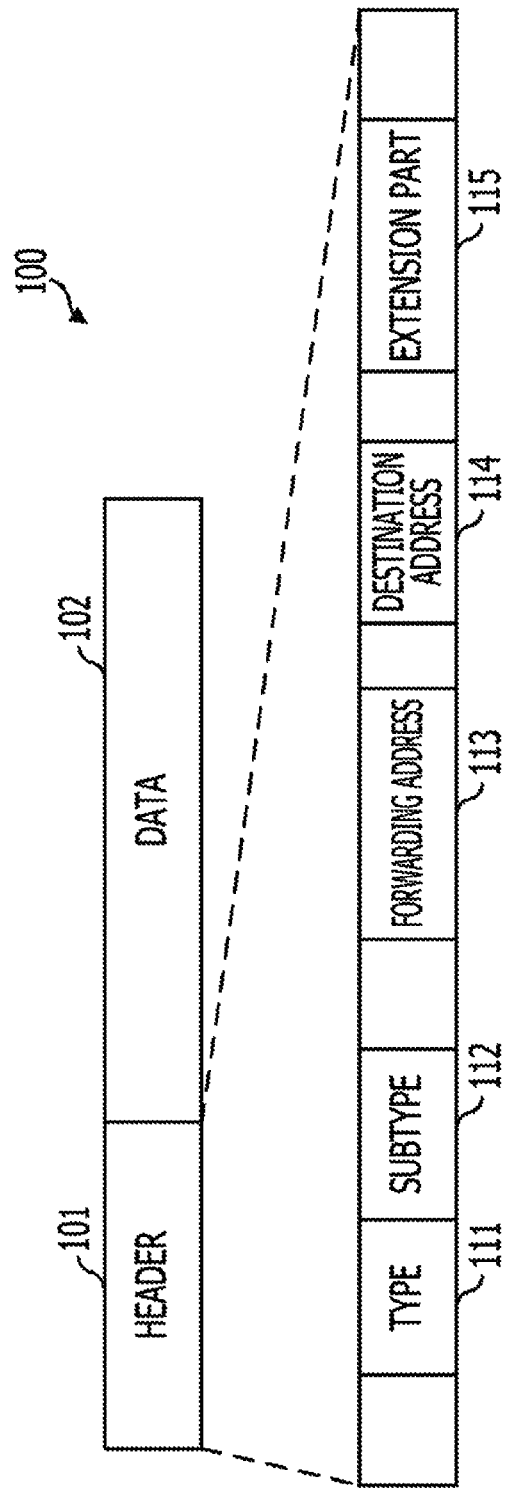
FIG. 6 is an explanatory diagram of a header format of a packet of a first layer.

FIG. 6 is an explanatory diagram of a header format of the first layer packet. A first layer packet 100 includes a header 101 and a data 102. The header 101 includes a type 111, a subtype 112, a forwarding address 113, a destination address 114, and an extension part 115. The type 111 and the subtype 112 indicate a type of packet. The forwarding address 113 is the first layer address that indicates the forwarding address of the packet 100. The destination address 114 is the first layer address that indicates the destination address of the packet 100. If the destination address in the second layer is stored in the header 101, the first layer packet generating unit 33 may store the destination address in the extension part 115.

Embodiments will be described with reference to FIG. 3. If the forwarding layer is the second layer, the path determining unit 41 outputs the destination address and the forwarding address to the second forwarding unit 34. The second layer address is used as the forwarding address and the destination address. The second forwarding unit 34 outputs the destination address and the forwarding address, which are received from the path determining unit 41, to the second layer packet generating unit 35. The second layer packet generating unit 35 stores the destination address and the forwarding address, which are received from the second forwarding unit 34, in the header.

Figure 7:
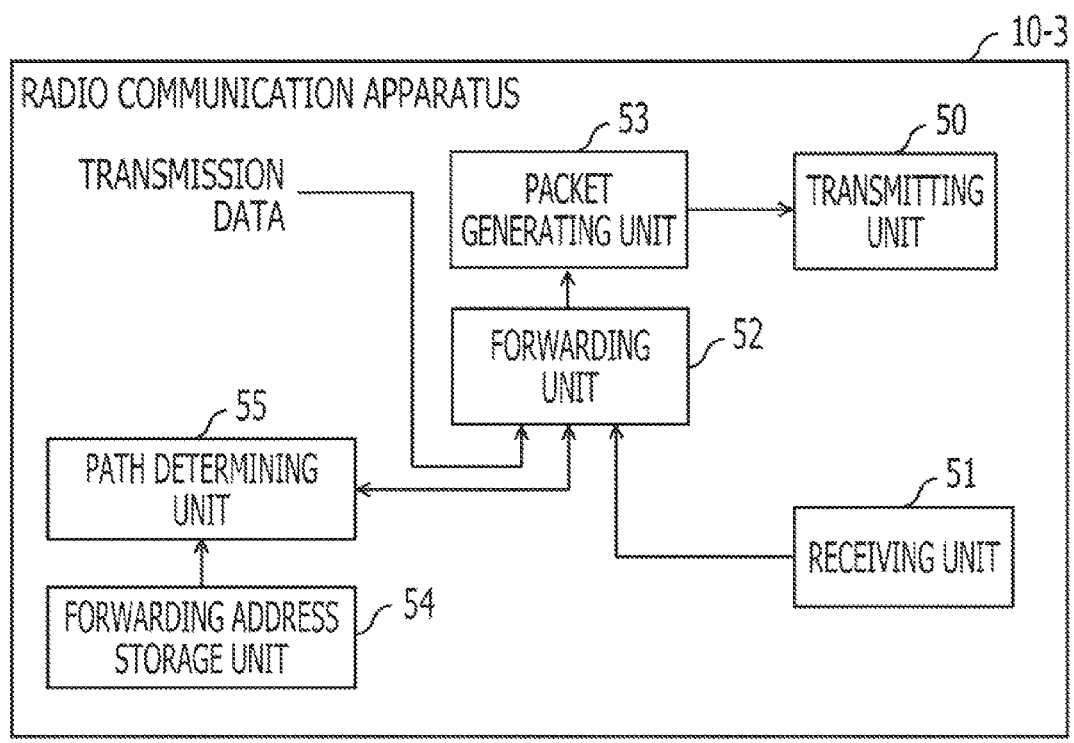
FIG. 7 is a diagram illustrating a configuration example of a radio communication apparatus of a second type.

FIG. 7 is a diagram illustrating a configuration example of the radio communication apparatus 10-3 of the second type. The processing performed by components of the radio communication apparatus 10-3 is realized if the processor 20 executes the forwarding program stored in the auxiliary storage device 22 illustrated in FIG. 2. FIG. 7 illustrates mainly functions related to the explanation of the embodiment. The radio communication apparatus 10-4 of the second type may include a configuration equivalent to the radio communication apparatus 10-3. The other embodiments have the similar configurations.

The radio communication apparatus 10-3 of the second type includes a transmitting unit 50, a receiving unit 51, a forwarding unit 52, a packet generating unit 53, a forwarding address storage unit 54, and a path determining unit 55. The transmitting unit 50 transmits a packet to another radio communication apparatus. The receiving unit 51 receives the packet that is transmitted from the other radio communication apparatus. The forwarding unit 52 obtains a data part from the received second layer packet and outputs the data part to the packet generating unit 53.

The forwarding unit 52 performs the forwarding processing in the second layer for forwarding the packet received by the receiving unit 51 to the radio communication apparatus as the next forwarding destination. Furthermore, the forwarding unit 52 performs the forwarding processing in the second layer for forwarding the packet received from the radio communication apparatus 10-3 as the transmission source to the radio communication apparatus as the next forwarding destination. In the forwarding processing, the forwarding unit 52 obtains, from the path determining unit 55, the forwarding address in the second layer according to the destination address of the packet.

The packet generating unit 53 generates a packet that stores at least the destination address and the forwarding address and stores the data obtained from the received packet by the forwarding unit 52 or the data that is to be transmitted from the radio communication apparatus 10-3. The generated packet is transmitted by the transmitting unit 50.

The forwarding address storage unit 54 stores the forwarding address information that specifies the forwarding address that is set according to the destination address of the packet. The forwarding address information may be a routing table, for example. When receiving the destination address of the packet to be forwarded from the forwarding unit 52, the path determining unit 55 determines the forwarding address corresponding to the destination address based on the forwarding address information stored in the forwarding address storage unit 54.

Figure 8:
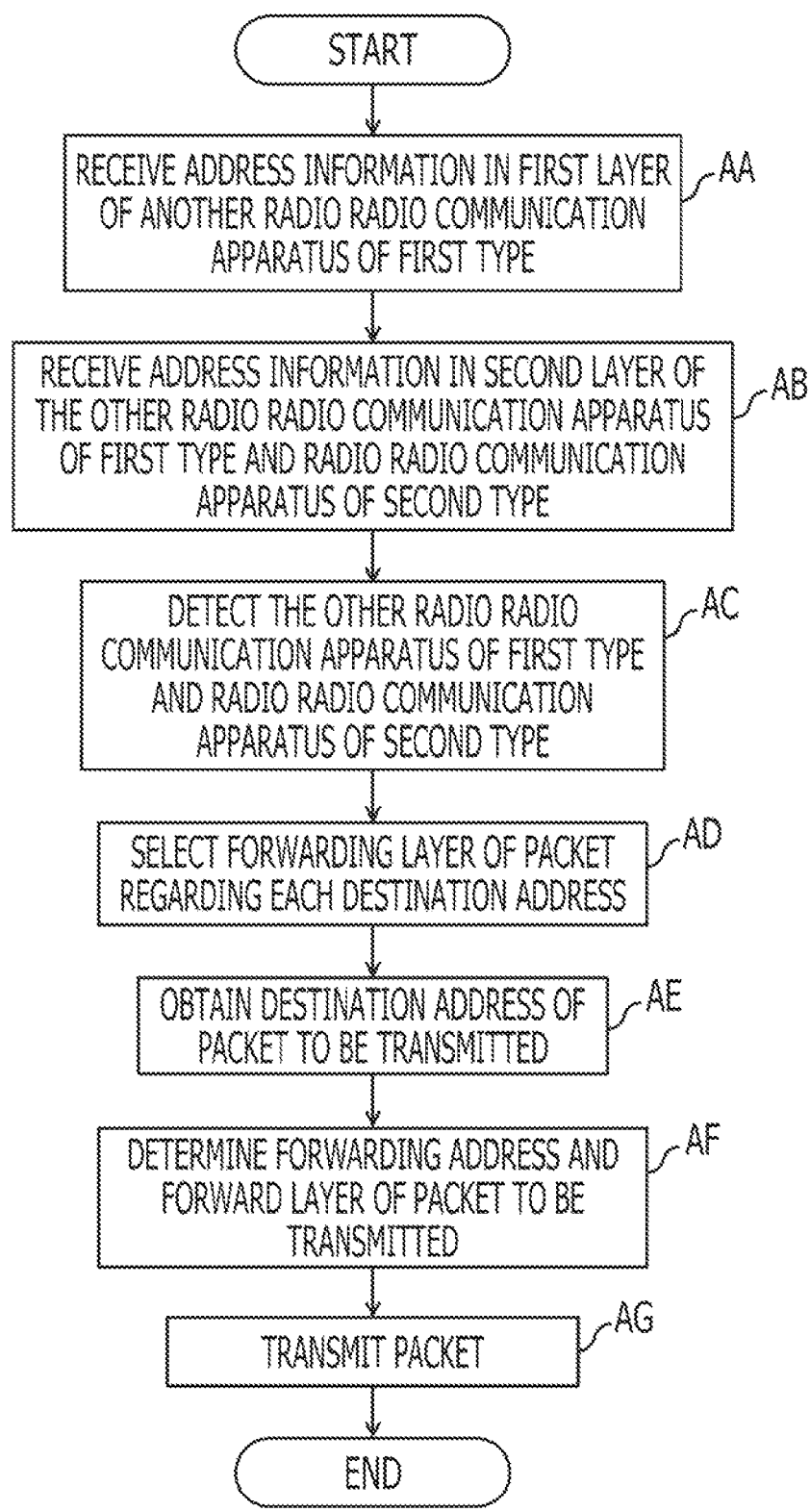
FIG. 8 is an explanatory diagram of a first example of processing of the radio communication apparatus of the first type.

An example of the processing by the radio communication apparatus 10-*a* illustrated in FIG. 3 will be described. FIG. 8 is an explanatory diagram of the first example of the processing by the radio communication apparatus 10-*a* of the first type. In the other embodiments, operations of operations AA to AG described below may be referred to as steps.

In Operation AA, the first address receiving unit 36 receives address information, which is related to the first layer address of the radio communication apparatus of the first type in the network 1, from another radio communication apparatus of the first type. In Operation AB, the second address receiving unit 37 receives the address information, which is related to the second layer address of the radio communication apparatus in the network 1, from the other radio communication apparatus.

In Operation AC, based on the address information received by the first address receiving unit 36 and the second address receiving unit 37, the detecting unit 38 detects the radio communication apparatuses 10-1, 10-2 and 10-5 of the first type and the radio communication apparatuses 10-3 and 10-4 of the second type.

In Operation AD, regarding the destination address that is stored or is scheduled to be stored in the forwarding address storage unit 39, the forwarding layer selecting unit 40 determines the forwarding layer in which the packet transmitted to this destination address is transmitted to the next forwarding address. The determined forwarding address may be stored in the forwarding address storage unit 39.

In Operation AE, the path determining unit 41 obtains a destination address of the packet to be transmitted. In Operation AF, the path determining unit 41 determines the forwarding address and the forwarding layer corresponding to the destination address.

If the forwarding layer is the first layer, in Operation AG, the path determining unit 41 outputs the destination address and the forwarding address to the first forwarding unit 32. The first forwarding unit 32 outputs the destination address and the forwarding address to the first layer packet generating unit 33. The first layer packet generating unit 33 generates the first layer packet based on the received address. The transmitting unit 30 transmits the generated first layer packet.

If the forwarding layer is the second layer, in Operation AG, the path determining unit 41 outputs the destination address and the forwarding address to the second forwarding unit 34. The second forwarding unit 34 outputs the destination address and the forwarding address to the second layer packet generating unit 35. The second layer packet generating unit 35 generates the second layer packet based on the received address. The second layer packet is encapsulated in the first layer packet by the first layer packet generating unit 33 and is then transmitted by the transmitting unit 30.

Figure 9:
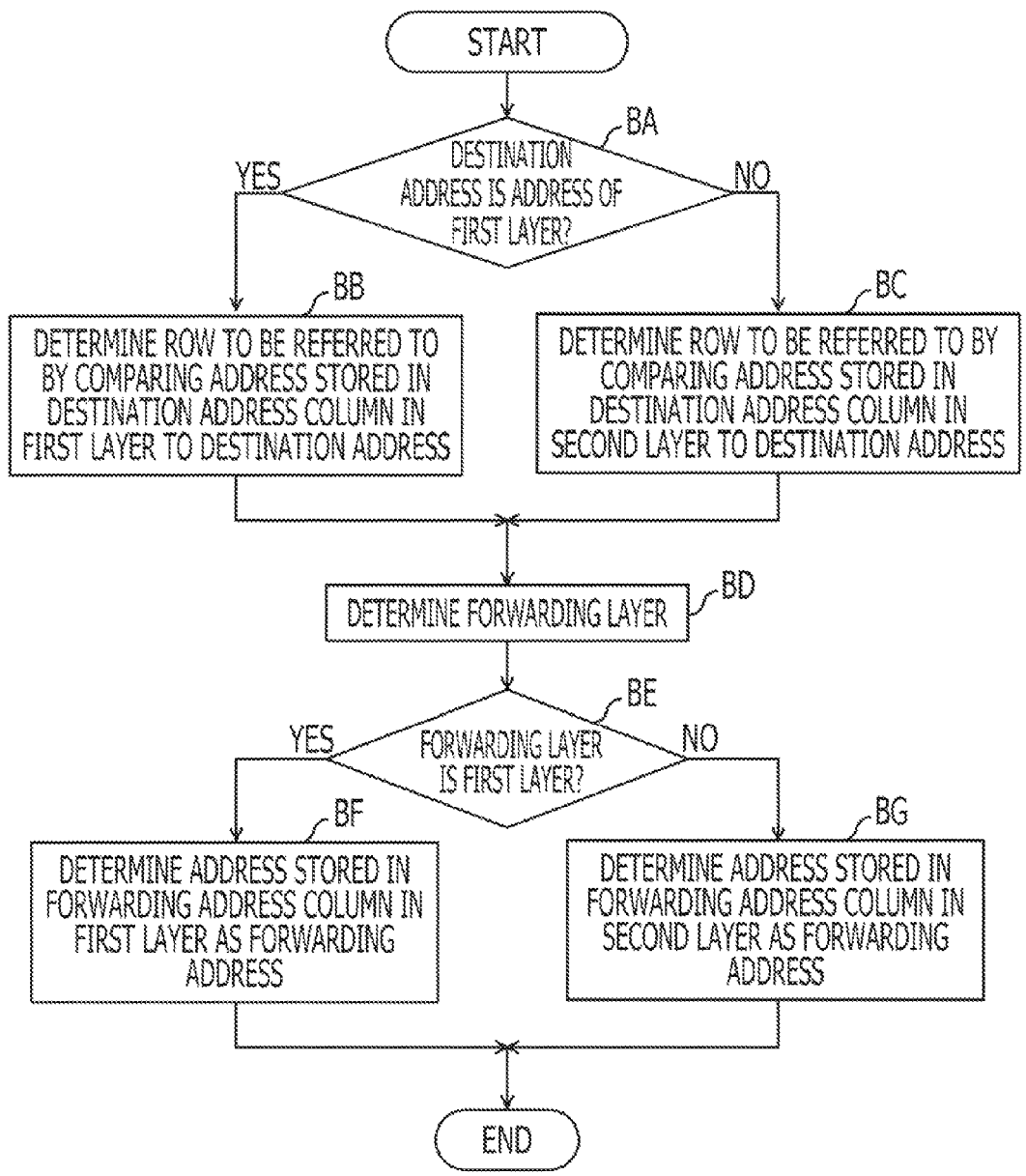
FIG. 9 is an explanatory diagram of an example of determining processing of a forwarding address and a forwarding layer.

FIG. 9 is an explanatory diagram of an example of determining processing of the forwarding address and the forwarding layer by the path determining unit 41 in Operation AF illustrated in FIG. 8. FIG. 9 illustrates, for example, processing in a case where the forwarding address information of the forwarding address storage unit 39 has the table structure illustrated in FIG. 5. In the other embodiments, operations of Operations BA to BG described below may be referred to as steps.

In Operation BA, the path determining unit 41 determines whether or not the destination address of the transmitted packet is the first layer address. If the destination address is the first layer address (Yes in Operation BA), the process goes to Operation BB. If the destination address is not the first layer address (No in Operation BA), the process goes to Operation BC.

In Operation BB, regarding each row of the forwarding address information, by comparing the address stored in the destination address column in the first layer to the destination address of the transmitted packet, the path determining unit 41 determines the row to be referred to. The process goes to Operation BD.

In Operation BC, regarding each row of the forwarding address information, by comparing the address stored in the destination address column in the second layer and the destination address of the transmitted packet, the path determining unit 41 determines the row to be referred to. The process goes to Operation BD.

In Operation BD, the path determining unit 41 determines the layer, which is stored in the forwarding layer column of the row determined by Operation BB or Operation BC, as the forwarding layer. In Operation BE, the path determining unit 41 determines whether or not the forwarding layer is the first layer. If the forwarding layer is the first layer (Yes in Operation BE), the process goes to Operation BF. If the forwarding layer is not the first layer (No in Operation BE), the process goes to Operation BG.

In Operation BF, the path determining unit 41 determines the address, which is stored in the forwarding address column in the first layer, as the forwarding address. The process ends. In Operation BG, the path determining unit 41 determines the address, which is stored in the forwarding address column in the second layer, as the forwarding address. The process ends.

The radio communication apparatus of the first type according to the present embodiment selects the forwarding layer depending on whether the radio communication apparatus of the forwarding address is the radio communication apparatus of the first type or the radio communication apparatus of the second type and then transmits the packet. Accordingly, if both the forwardsource and the forwarding destination are the radio communication apparatus of the first type, the packet may be forwarded in the first layer. On the other hand, if at least either the forward source or the forwarding destination is the radio communication apparatus of the second type, the packet is forwarded in the second layer. Therefore, according to the present embodiment, the multi-hop communication in which the packet forwards in the first layer and the second layer are performed.

Figure 10:
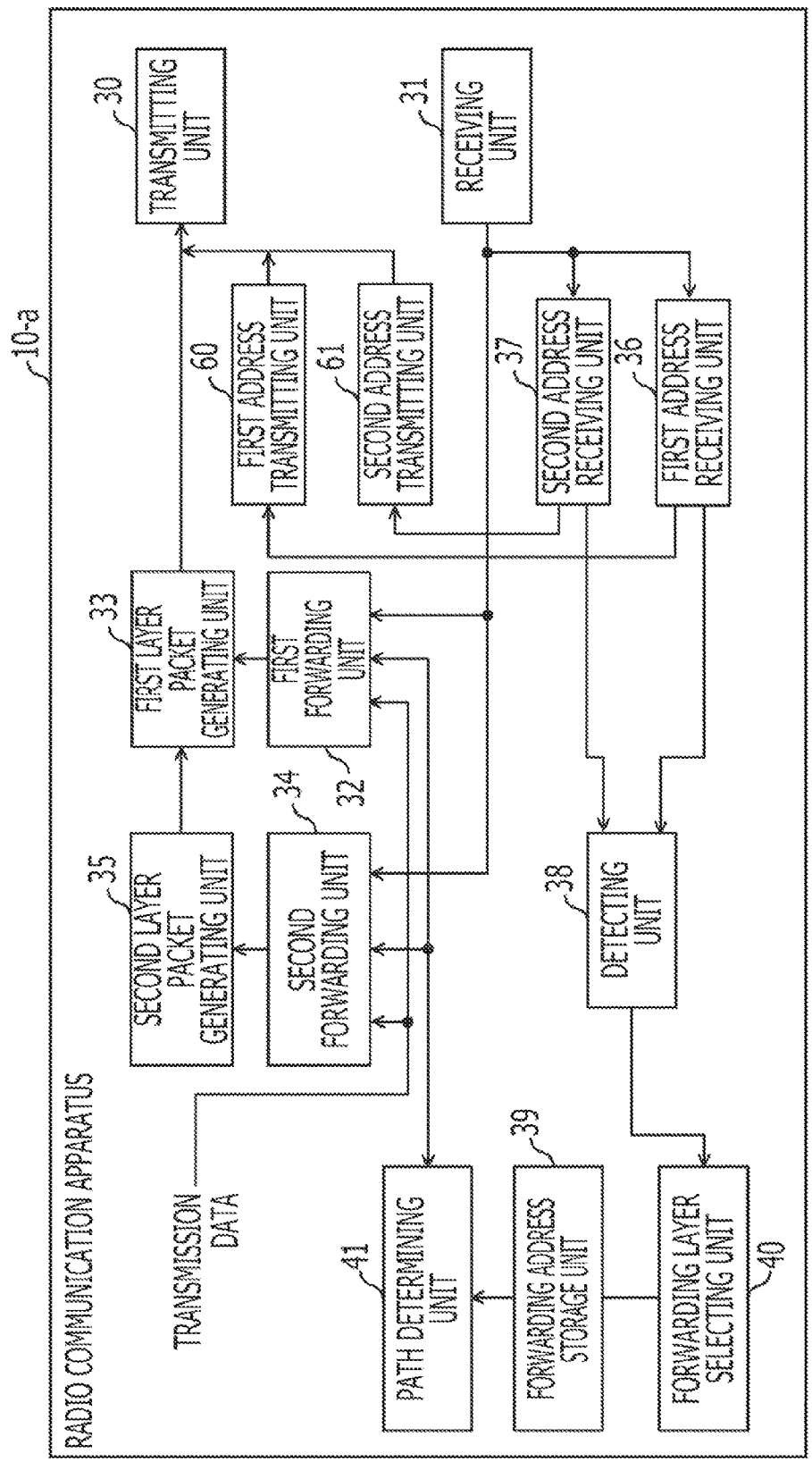
FIG. 10 is a diagram illustrating a second configuration example of the radio communication apparatus of the first type.

Another configuration example of the radio communication apparatus 10-*a* of the first type will be described. FIG. 10 is a diagram illustrating a second configuration example of the radio communication apparatus 10-*a*. The components equivalent to the components illustrated in FIG. 3 are indicated with the similar reference numerals. The radio communication apparatus 10-*a* of the first type further includes a first address transmitting unit 60 and a second address transmitting unit 61. Another configuration of the radio communication apparatus 10-*a* described below may also include the first address transmitting unit 60 and the second address transmitting unit 61.

The first address transmitting unit 60 reports the address information related to the first layer address of the radio communication apparatus 10-*a* to another radio communication apparatus. Furthermore, the first address transmitting unit 60 may report the address information, which is related to the first layer address of the other radio communication apparatus of the first type obtained by the radio communication apparatus 10-*a* after being received by the first address receiving unit 36.

The second address transmitting unit 61 reports the address information related to the second layer address of the radio communication apparatus 10-*a* to another radio communication apparatus. Furthermore, the second address transmitting unit 61 may report the address information, which is related to the second layer address of the other radio communication apparatus obtained by the radio communication apparatus 10-*a* after being received by the second address receiving unit 37.

Similarly, the radio communication apparatus 10-3 of the second type may include an address transmitting unit that reports the address information, which is related to the second layer address of the radio communication apparatus 10-3, to another radio communication apparatus. Another configurations of the radio communication apparatus 10-3 described below may also include the address transmitting unit.

Since each of the radio communication apparatuses 10-*a*, and 10-1 to 10-5 reports the address information, the radio communication apparatus 10-*a* receives the first layer address and the second layer address for the radio communication apparatus of the first type and receives the second layer address for the radio communication apparatus of the second type. Therefore, according to the embodiment, the radio communication apparatus 10-*a* may determine the type of each radio communication apparatus by determining the type of the address received for the radio communication apparatus, respectively.

Figure 11:
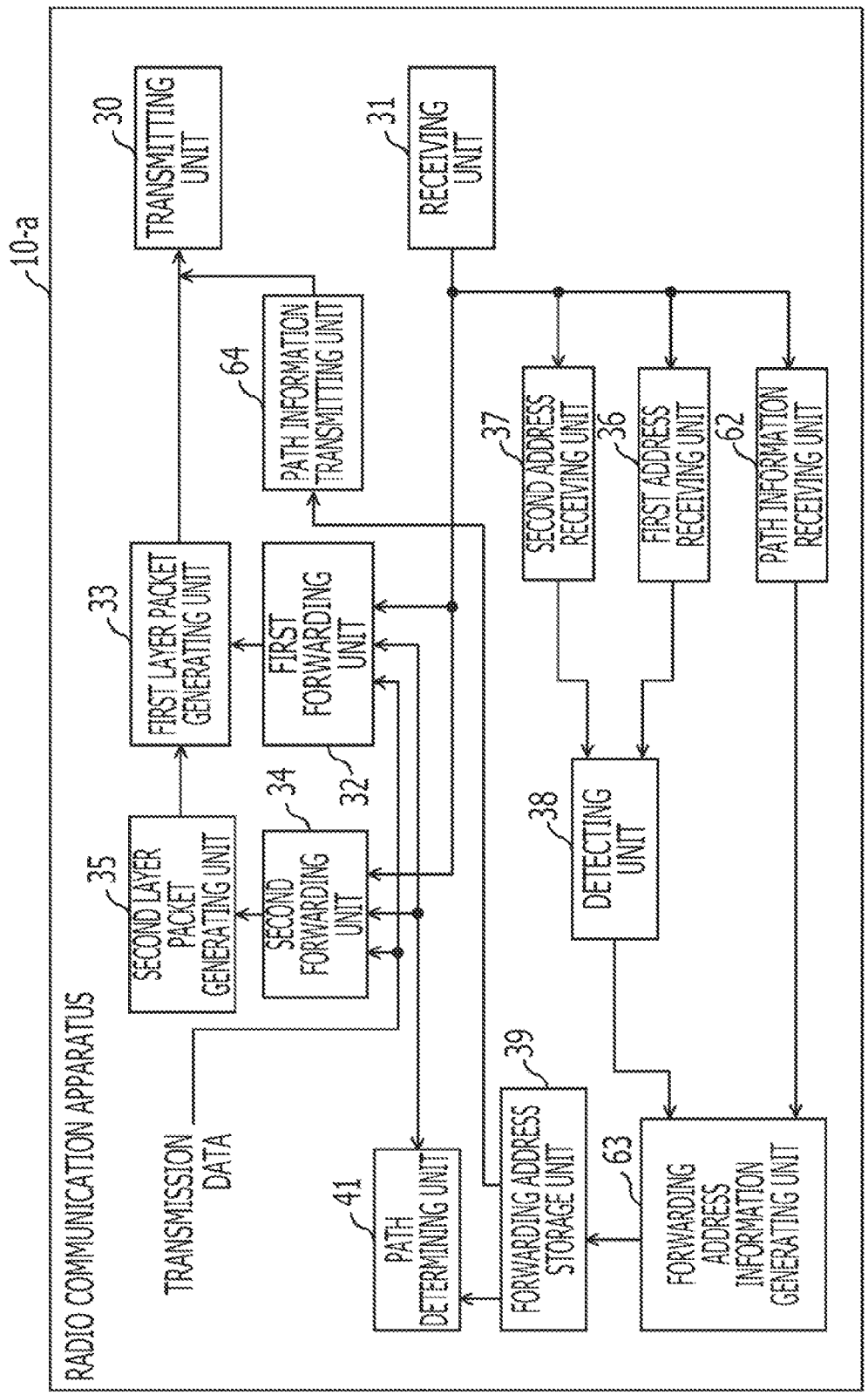
FIG. 11 is a diagram illustrating a third configuration example of the radio communication apparatus of the first type.

Another configuration of the radio communication apparatus 10-*a* of the first type will be described. FIG. 11 is a diagram illustrating a third configuration example of the radio communication apparatus 10-*a* of the first type. The components equivalent to the components illustrated in FIG. 3 are indicated with the similar reference numerals. The radio communication apparatus 10-*a* of the first type further includes a path information receiving unit 62, a forwarding address information generating unit 63, and a path information transmitting unit 64. Another configuration of the radio communication apparatus 10-*a* described below may also include the path information receiving unit 62, the forwarding address information generating unit 63, and the path information transmitting unit 64. The processing by the forwarding layer selecting unit 40 illustrated in FIG. 3 may be performed by the forwarding address information generating unit 63.

The path information receiving unit 62 receives path information from the radio communication apparatuses 10-1 to 10-5. The path information includes at least a combination of the transmission source address of the radio communication apparatus as the transmission source of the path information and the destination address to which the packet may be forwarded from the radio communication apparatus as the transmission source. The radio communication apparatuses 10-1, 10-2, and 10-5 of the first type may report the path information related to the first layer address and the path information related to the second layer address. The radio communication apparatuses 10-3 and 10-4 of the second type may report the path information related to the second layer address and the path information related to the second layer address.

The first address receiving unit 36 and the path information receiving unit 62 may obtain each of the address information and the path information from the same packet, respectively. The second address receiving unit 37 and the path information receiving unit 62 may obtain the address information and the path information from the same packet, respectively. The packet, which stores the address information related to the first layer address, may store the path information related to the first layer address. The packet, which stores the address information related to the second layer address, may store the path information related to the second layer address.

The forwarding address information generating unit 63 generates the forwarding address information by determining the transmission source address, which is combined with the destination address, as a forwarding address. The forwarding address information generating unit 63 stores the generated forwarding address information in the forwarding address storage unit 39.

The path information transmitting unit 64 generates the path information, which includes the address of the radio communication apparatus 10-*a* and the destination address stored in the forwarding address storage unit 39, and reports the path information to another radio communication apparatus. Similarly, the radio communication apparatus 10-3 of the second type may include a path information transmitting unit that reports the path information, which is related to the destination address that is forwardable by the radio communication apparatus 10-3, to another radio communication apparatus.

Figure 12:
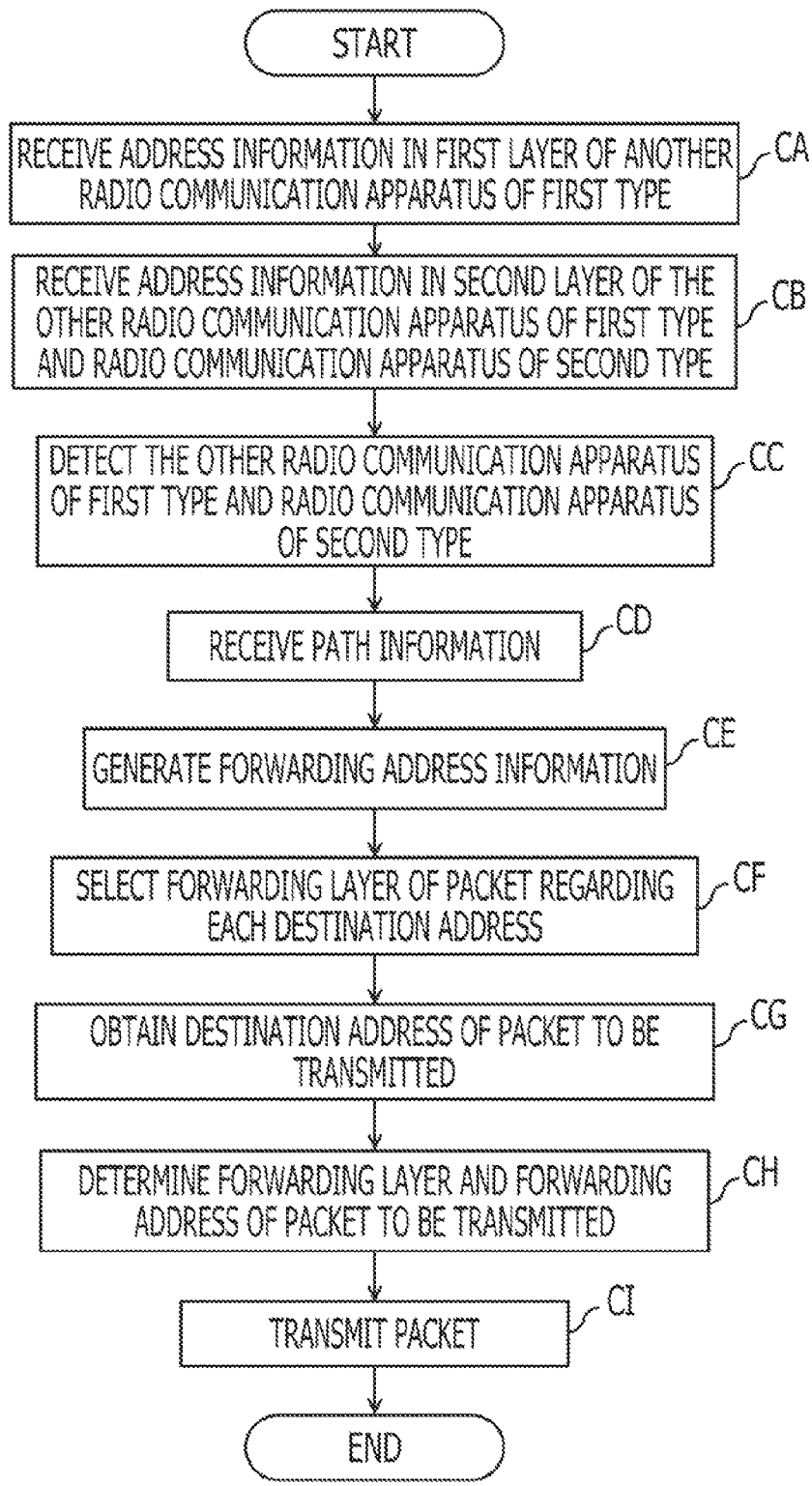
FIG. 12 is an explanatory diagram of a second example of the processing of the radio communication apparatus of the first type.

An example of the processing by the radio communication apparatus 10-*a* illustrated in FIG. 11 will be described. FIG. 12 is an explanatory diagram of the second example of the processing by the radio communication apparatus 10-*a* of the first type. In other embodiments, operations of Operations CA to CI described below may be referred to as steps.

The processing in Operations CA to CC is equivalent to the processing in Operations AA to AC illustrated in FIG. 8. In Operation CD, the path information receiving unit 62 receives the path information from the radio communication apparatuses 10-1 to 10-5. In Operation CE, the forwarding address information generating unit 63 generates forwarding address information.

In Operation CF, regarding the destination address that is stored or is scheduled to be stored in the forwarding address storage unit 39, the forwarding address information generating unit 63 determines the forwarding layer in which the packet transmitted to this destination address is forwarded to the next forwarding address. The processing in Operations CG to CI is equivalent to Operation AE to AG illustrated in FIG. 8.

Regarding the radio communication apparatus of the first type, the radio communication apparatus 10-*a* may store the first layer address as well as the second layer address as the forwarding address in the forwarding address storage unit 39. According to the present embodiment, the radio communication apparatus 10-*a* may forward the packet to the radio communication apparatus of the second type in the second layer by using the second layer address and may forward the packet to the radio communication apparatus of the first type in the first layer by using the first layer address. According to the present embodiment, the multi-hop communication network in which the packet forwards in the first layer and the second layer are performed.

Figure 13:
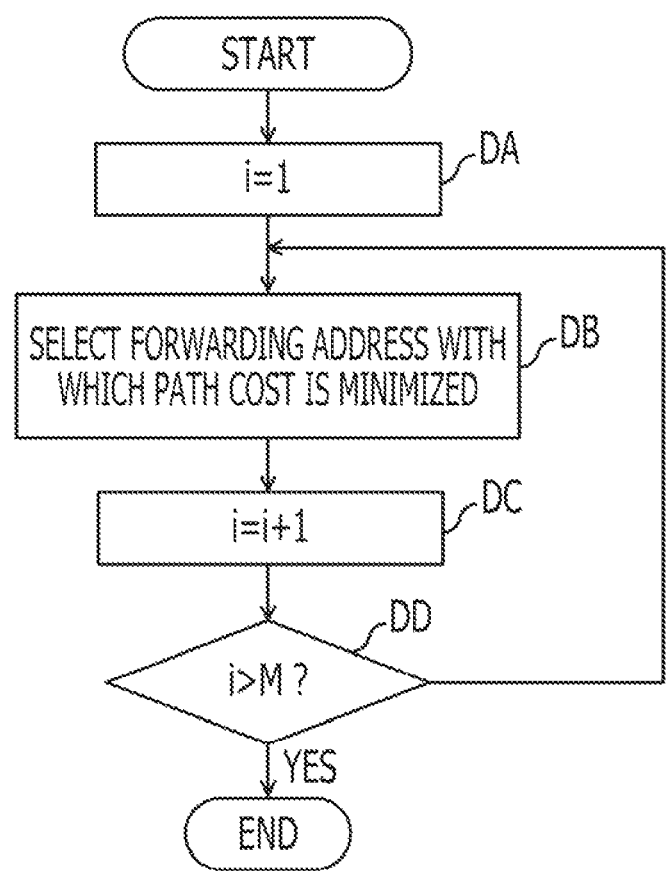
FIG. 13 is an explanatory diagram of a first example of generating processing of the forwarding address information.

An example of generating processing of forwarding address information will be described. FIG. 13 is an explanatory diagram of a first example of the generating processing of the forwarding address information. In other embodiments, operations of Operations DA to DD described below may be referred to as steps. In the description below, regarding M radio communication apparatuses, the path information receiving unit 62 is assumed to obtain the path information with the address of each radio communication apparatus as a destination address.

In the example illustrated in FIG. 13, if there is a plurality of forwarding addresses by which a packet may be transmitted to the same destination address, the forwarding address information generating unit 63 selects the forwarding address, with which the path cost from the forwarding address to the destination address is minimized, as the forwarding address to be used. Therefore, the path information obtained from another radio communication apparatus may include at least a combination of an address of the radio communication apparatus as the transmission source of the path information, a destination address that is forwardable from the radio communication apparatus as the transmission source, and the path cost between the radio communication apparatus and the destination address.

The value of the path cost may be calculated as a function of the processing delay of the packet forwarding, for example. The processing delay may be a value that varies according to a forwarding layer used to forward the packet. In addition to or instead of the processing delay, the value of the path cost may be calculated as a function of throughput of the number of hops, a load of the radio communication apparatus, a radio quality of each path, a packet of each path and/or of throughput of the packet in the radio communication apparatus. For example, regarding to the number of hops and the load of the radio communication apparatus, a calculating method of the path cost may be set so that the value of the path cost increases as the values of the number of hops and the load of the radio communication apparatus are larger. Regarding the radio quality and the throughput, the calculating method of the path cost may be set so that the value of the path cost decreases as the values of the number of hops and the load of the radio communication apparatus are larger. For example, the value of the path cost may be calculated by combining the value obtained by multiplying a weight coefficient by the processing delay, the number of hops, the load, the radio quality and/or the throughput. The weight coefficient may vary by learning.

In Operation DA, the forwarding address information generating unit 63 assigns a value "1" to a variable number i. In Operation DB, from among the forwarding addresses corresponding to an i-th destination address, the forwarding address information generating unit 63 selects the forwarding address of the path information, with which the past cost is minimized, as a forwarding address to be used. In Operation DA, the forwarding address information generating unit 63 increases the value of the variable number i by one. In Operation DD, the forwarding address information generating unit 63 determines whether or not the variable number i is larger than M. If the variable number i is larger than M (Yes in Operation DD), the process ends. If the variable number i is equal to or smaller than M (No in Operation DD), the process goes back to Operation DB.

According to the embodiment, the address of the radio communication apparatus with which the path cost to the destination address is minimized may be selected as the forwarding address.

Figure 14:
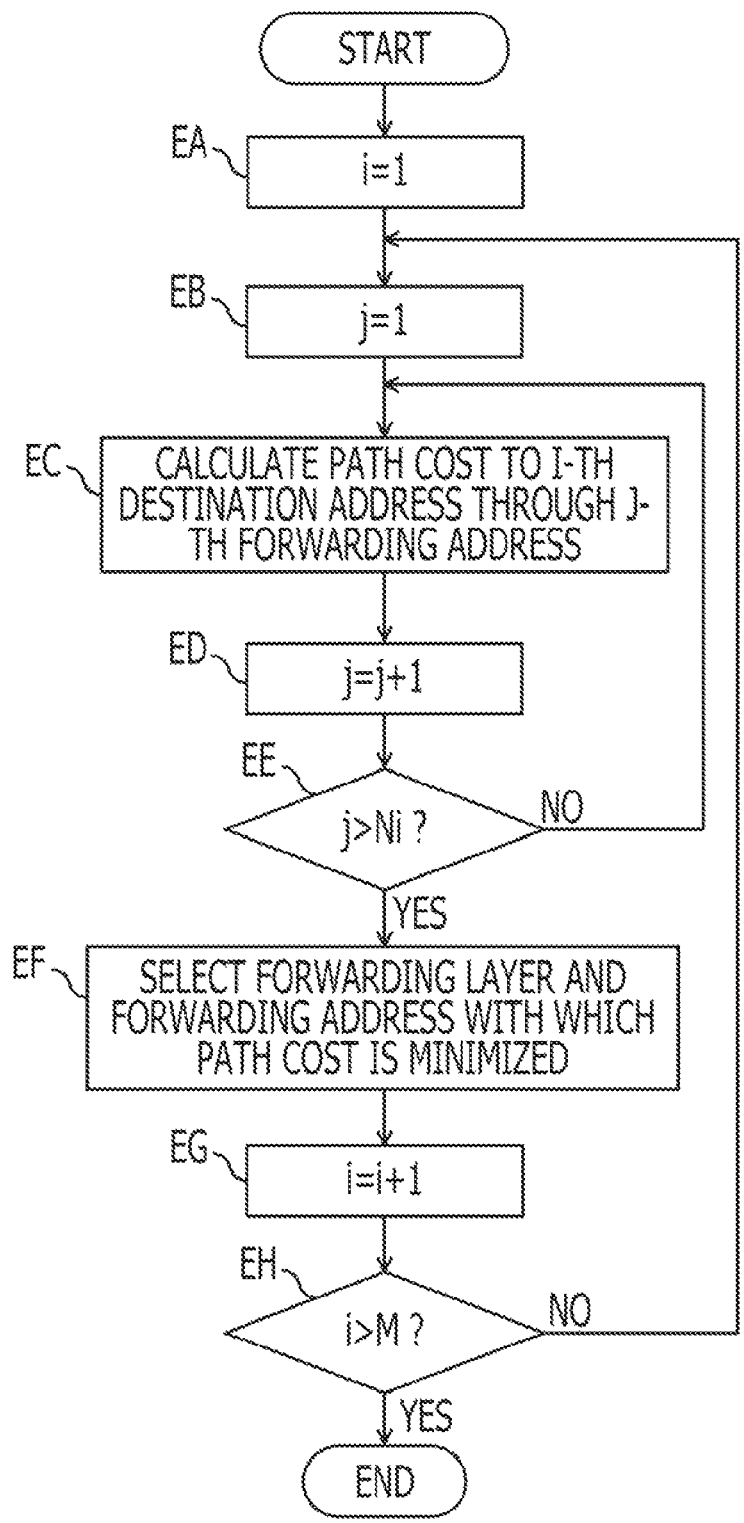
FIG. 14 is an explanatory diagram of an example of the generating processing of the forwarding address information and the determining processing of the forwarding layer.

FIG. 14 is an explanatory diagram of an example of the generating processing of the forwarding address information and the determining processing of the forwarding layer. In other embodiments, operations of Operation EA to EH described below may be referred to as steps. In the description below, regarding the M radio communication apparatuses, the path information receiving unit 62 is assumed to obtain the path information with an address of each radio communication apparatus as the destination address. The path information receiving unit 62 is assumed to obtain Ni forwarding addresses corresponding to the i-th destination address.

In the example illustrated in FIG. 14, by adding the path cost from the radio communication apparatus 10-a to the forwarding address to the path cost from each forwarding address to the destination address, the forwarding address information generating unit 63 calculates a path cost from the radio communication apparatus 10-a to the destination address. The forwarding address information generating unit 63 selects the forwarding address, with which the calculated path cost is minimized, as the forwarding address to be used.

The path cost from the radio communication apparatus 10-a to the forwarding address may be a function of the processing delay of the forwarding to the forwarding address. The processing delay of the forwarding to the forwarding address may be a value that varies according to the forwarding layer used for the forwarding to the forwarding address.

For example, if the forwarding address is the first layer address, the processing delay of the forwarding to the forwarding address may be processing delay in a case where the forwarding layer is the first layer. If the forwarding address is the second layer address, the processing delay of the forwarding to the forwarding address may be processing delay in a case where the forwarding layer is the second layer.

If the forwarding address is selected, the forwarding address information generating unit 63 determines that the layer that is assumed to be the forwarding layer to the forwarding address when the processing delay of the forwarding to the forwarding address is determined.

In Operation EA, the forwarding address information generating unit 63 assigns the value "1" to the variable number i. In Operation EB, the forwarding address information generating unit 63 assigns the value "1" to a variable number j. In Operation EC, the forwarding address information generating unit 63 calculates a path cost from the radio communication apparatus 10-a to the i-th destination address where the packet is forwarded to the radio communication apparatus of a j-th forwarding address.

In Operation ED, the forwarding address information generating unit 63 increases the value of the variable number j by one. In Operation EE, the forwarding address information generating unit 63 determines whether or not the variable number j is larger than Ni. If the variable number j is larger than Ni (Yes in Operation EE), the process goes to Operation EF. If the variable number is equal to or smaller than Ni (No in Operation EE), the process goes back to Operation EC.

In Operation EF, from among the forwarding addresses obtained for the i-th destination address, the forwarding address information generating unit 63 selects the forwarding address of the path information, with which the path cost calculated in Operation EC is minimized, as the forwarding address to be used. The forwarding address information generating unit 63 determines the forwarding layer.

In Operation EG, the forwarding address information generating unit 63 increases the value of the variable number i by one. In Operation EH, the forwarding address information generating unit 63 determines whether or not the variable number i is larger than M. If the variable number i is larger than M (Yes in Operation EH), the process ends. If the variable number i is equal to or smaller than M (No in Operation EH), the process goes back to Operation EB.

According to the present embodiment, the forwarding address and the forwarding layer may be determined so that the path cost from the radio communication apparatus 10-a to the destination address is minimized.

Figure 15:
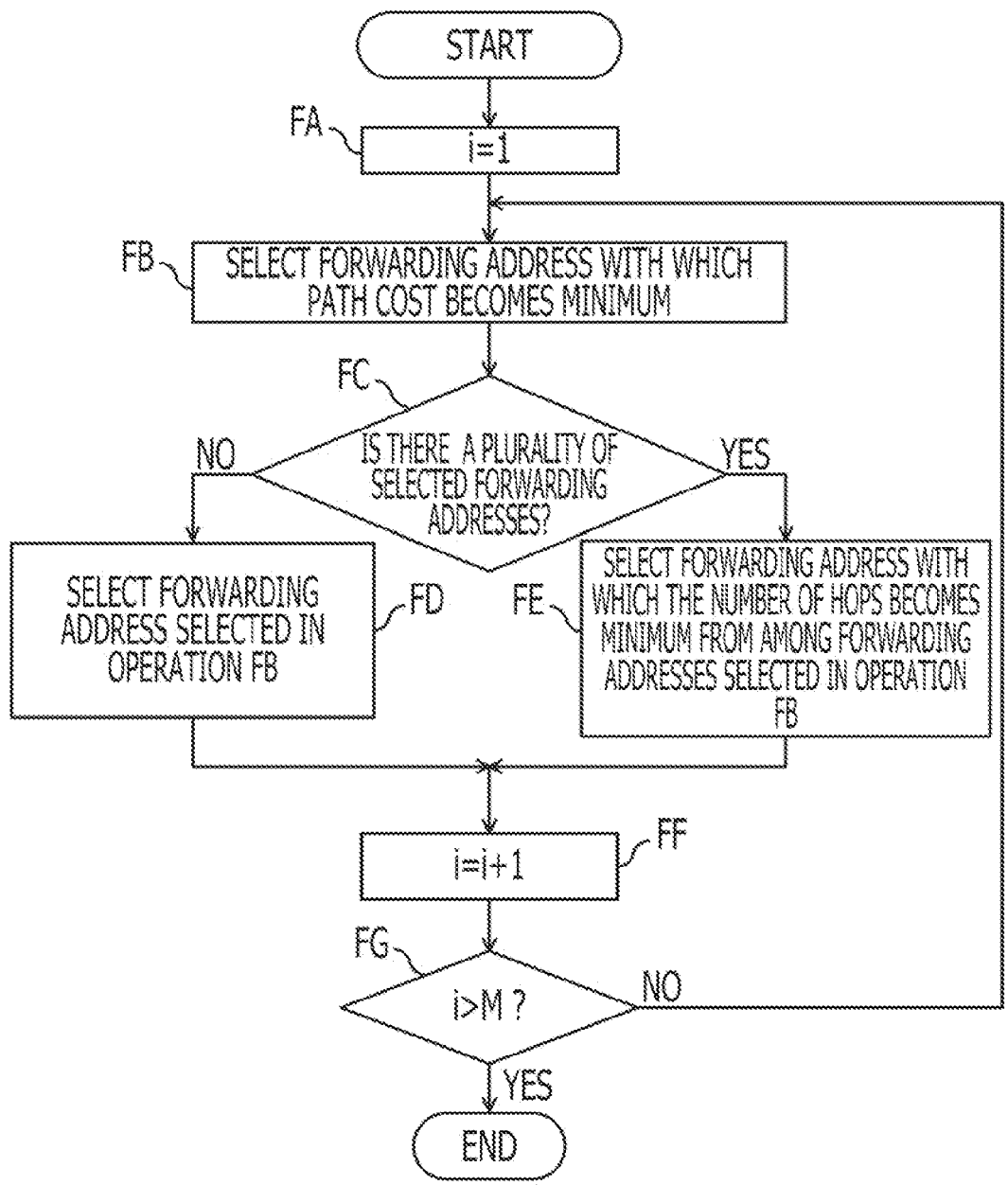
FIG. 15 is an explanatory diagram of a second example of the generating processing of the forwarding address information.

FIG. 15 is an explanatory diagram of a second example of the generating processing of the forwarding address information. In other embodiments, operations of Operations FA to FG described below may be referred to as steps. In the description below, the path information receiving unit 62 is assumed to obtain the path information with the address of each radio communication apparatus as the destination address regarding the M radio communication apparatuses.

If there is a plurality of forwarding addresses with which the path cost is minimized and the packet may arrive at the same destination address, the forwarding address information generating unit 63 selects the forwarding address, with which the number of hops to the destination address is minimum, as the forwarding address to be used. The path information received from the other radio communication apparatus may include at least an address of the radio communication apparatus as the transmission source of the path information, a destination address that is forwardable from the radio communication apparatus as the transmission source, and a combination of the path cost from the radio communication apparatus to the destination address and of the number of hops.

In Operation FA, the forwarding address information generating unit 63 assigns the value "1" to the variable number i. In Operation FB, from among the forwarding addresses obtained for the i-th destination address, the forwarding address information generating unit 63 selects the forwarding address of the path information in which the path cost is minimized.

In Operation FC, the forwarding address information generating unit 63 determines whether or not a plurality of forwarding addresses is selected in Operation FB. If a plurality of forwarding addresses is not selected (No in Operation FC), the process goes to Operation FD. If a plurality of forwarding addresses is selected (Yes in Operation FC), the process goes to Operation FE.

In Operation FD, the forwarding address information generating unit 63 selects the address selected in Operation FB as the forwarding address. The process goes to Operation FF.

In Operation FE, the forwarding address information generating unit 63 selects the forwarding address with the minimum number of hops from among the addresses selected in Operation FB. The process goes to Operation FF. In Operation FF, the forwarding address information generating unit 63 increases the value of the variable number i by one. In Operation FG, the forwarding address information generating unit 63 determines whether or not the variable number i is larger than M. If the variable number i is larger than M (Yes in Operation FG), the process ends. If the variable number i is equal to or smaller than M (No in Operation FG), the process goes back to Operation FB.

In Operation FB illustrated in FIG. 15, the forwarding address may be selected by calculating the path cost from the radio communication apparatus 10-a to the destination address in the similar way as in the processing illustrated in FIG. 14.

According to the present embodiment, if there is a plurality of forwarding addresses with the equal path cost obtained by the processing delay, the path with the minimum number of hops may be selected. Therefore, the number of relay in the network may be decreased. This may reduce a processing load of the radio communication apparatus.

Figure 16:
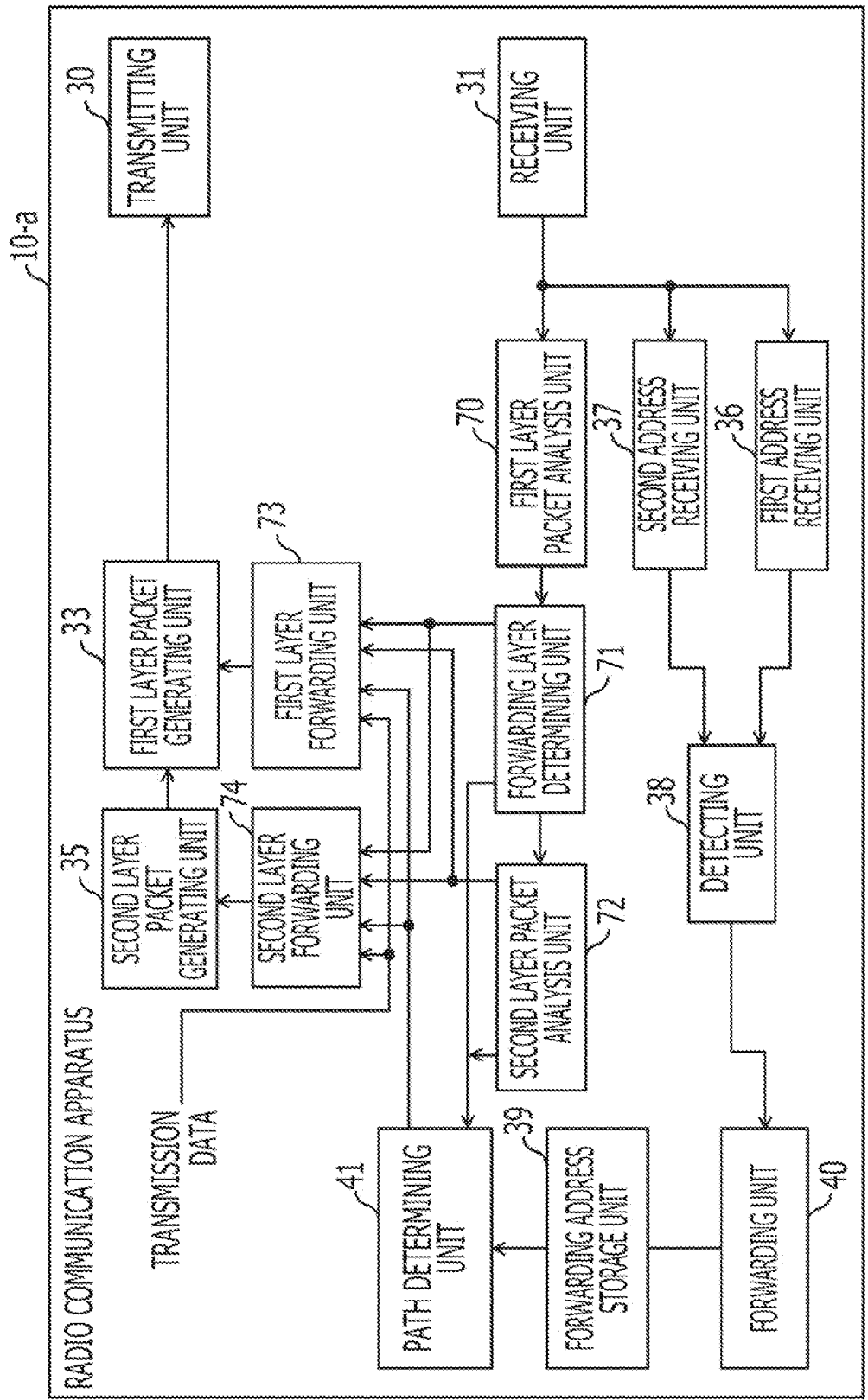
FIG. 16 is a diagram illustrating a fourth configuration example of the radio communication apparatus of the first type.

Another configuration example of the radio communication apparatus 10-a of the first type will be described. FIG. 16 is a diagram illustrating a fourth configuration example of the radio communication apparatus 10-a of the first type. Components equivalent to the components illustrated in FIG. 3 are indicated with the similar numerals. The configuration example illustrated in FIG. 16 describes a configuration example of the first forwarding unit 32 and the second forwarding unit 34 illustrated in FIG. 3. A first layer packet analysis unit 70, a forwarding layer determining unit 71, a second layer packet analysis unit 72, a first layer forwarding unit 73, and a second layer forwarding unit 74 described below may be examples of the first forwarding unit 32 and the second forwarding unit 34.

The first layer packet analysis unit 70 analyzes the first layer packet that is received by the receiving unit 31. The forwarding layer determining unit 71 determines the forwarding layer of the packet that is received according to an analysis result from the first layer packet analysis unit 70. That is, the forwarding layer determining unit 71 determines whether the received first layer packet stores transmission data as a data unit or the transmission data is stored in a second layer packet that is encapsulated in the first layer packet.

The forwarding layer determining unit 71 may determine the forwarding layer according to a value of a header of the first layer packet. For example, the forwarding layer determining unit 71 may determine the forwarding layer according to the value of the type 111 and the subtype 112 of the packet 100 illustrated in FIG. 6. If the forwarding layer is the first layer, the forwarding layer determining unit 71 outputs the data stored in the data unit 102 of the first layer packet to the first layer forwarding unit 73 and the second layer forwarding unit 74.

The forwarding layer determining unit 71 outputs the destination address stored in the header to the path determining unit 41. For example, the forwarding layer determining unit 71 may output the first layer address stored in the destination address 114 of the packet 100 illustrated in FIG. 6 to the path determining unit 41. Furthermore, for example, the forwarding layer determining unit 71 may output the destination address of the second layer address stored in the extension part 115 of the packet 100 to the path determining unit 41. The forwarding layer determining unit 71 may determine whether or not the destination address is stored in the extension part 115 according to the value of the type 111 and the subtype 112.

If the forwarding layer is the second layer, the forwarding layer determining unit 71 outputs the second layer packet that is encapsulated in the first layer packet to the second layer packet analysis unit 72. The second layer packet analysis unit 72 analyzes the second layer packet and outputs the data stored in the data unit of the second layer packet to the first layer forwarding unit 73 and the second layer forwarding unit 74. The second layer packet analysis unit 72 outputs the destination address stored in the header to the path determining unit 41.

The first layer forwarding unit 73 outputs, to the first layer packet generating unit 33, the data received from the forwarding layer determining unit 71 or the second layer packet analysis unit 72, or the data transmitted from the radio communication apparatus 10-a as the transmission source. The first layer forwarding unit 73 performs the forwarding processing in the first layer for forwarding the data that is output to the first layer packet generating unit 33 to the radio communication apparatus as the next forwarding destination. In the forwarding processing, the first layer forwarding unit 73 obtains and sends the destination address and the forwarding address of the packet to the first layer packet generating unit 33.

The second layer forwarding unit 74 outputs, to the second layer packet generating unit 35, the data received from the forwarding layer determining unit 71 or the second layer packet analysis unit 72, or the data transmitted from the radio communication apparatus 10-a as the transmission source. The second layer forwarding unit 74 performs the forwarding processing in the second layer for forwarding the data output to the second layer packet generating unit 35 to the radio deice as the next forwarding destination. In the forwarding processing, the second layer forwarding unit 74 obtains and sends the destination address and the forwarding address of the packet to the second layer packet generating unit 35.

According to the present embodiment, the forwarding layer determining unit 71 determines the forwarding layer of the packet. If the forwarding layer is the first layer, reception data may be obtained from the first layer packet that is lower than the second layer packet. As a result, the analyzing processing of the second layer packet is omitted, so that the speed of the forwarding processing may be increased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio communication apparatus comprising:
   a radio communication interface configured to transmit or receive radio signals; and
   a processor configured
      to control the radio communication interface to forward a packet to a next forwarding destination in a first layer;
      to control the radio communication interface to forward the packet to the next forwarding destination in a second layer which is higher than the first layer;
      to control the radio communication interface to receive a piece of address information of another radio communication apparatus in the first layer from a first radio communication apparatus as the other radio communication apparatus which forwards the packet in the first layer;
      to control the radio communication interface to receive the piece of address information of the other radio communication apparatus in the second layer from the first radio communication apparatus and receives the piece of the address information of the radio communication apparatus of a second type in the second layer from a second radio communication apparatus which forwards the packet in the second layer;
      to detect the first radio communication apparatus and the second radio communication apparatus based on the piece of address information received by the radio communication interface; and
      to select one of the first layer and the second layer as a forwarding layer, in which the packet is forwarded to a next forwarding address according to the radio communication apparatus of the next forwarding address corresponding to a destination address of the packet.

2. The radio communication apparatus according to claim 1, wherein
   the processor is further configured
      to control the radio communication interface to receive a piece of path information from the first radio communication apparatus and the second radio communication apparatus; and
      to generate a piece of forwarding destination information that specifies the next forwarding address corresponding to the destination address of the packet based on the received piece of path information; and
   the piece of path information includes a piece of address information of the radio communication apparatus as a transmission source of the piece of path information and the destination address by which the packet may be forwarded from the radio communication apparatus as the transmission source.

3. The radio communication apparatus according to claim 2, wherein
   the processor is further configured to determine the next forwarding destination based on a path cost which varies depending on whether a forwarding layer of the packet is one of the first layer and the second layer.

4. The radio communication apparatus according to claim 3, wherein the processor is further configured to determine the next forwarding address based on the number of hops in the path when the path costs of a plurality of paths are equal.

5. The radio communication apparatus according to claim 1, wherein;
   the processor is further configured
      to control the radio communication interface to receive the packet; and
      to determine whether the received packet is forwarded in one of the first layer and the second layer according to a value of a header of the received packet.

6. The radio communication apparatus according to claim 1, wherein when the packet is forwarded in the first layer, the processor is configured to store the destination address of the second layer in the header of the first layer to a memory.

7. A forwarding method of a packet which is performed by a radio communication apparatus, comprising:
   receiving a piece of address information of the first radio communication apparatus in the first layer from the first radio communication apparatus as another radio communication apparatus which selects one of the first layer and the second layer which is higher than the first layer as a layer in which the packet is forwarded;
   receiving the piece of address information, from the first radio communication apparatus, of the other radio communication apparatus in the second layer, and the piece of address information, from the second radio communication apparatus which forwards a packet in the second layer, of the second radio communication apparatus in the second layer;
   detecting the first radio communication apparatus and the second radio communication apparatus based on the received piece of address information;
   selecting one of the first layer and the second layer as the layer in which the packet is forwarded to the next forwarding address according to the radio communication apparatus of the next forwarding address which is specified for the destination address of the packet; and
   forwarding the packet in the selected layer to the next forwarding address.

* * * * *